United States Patent
Giordano (12)

(10) Patent No.: US 6,606,876 B1
(45) Date of Patent: Aug. 19, 2003

(54) SILENCER FOR REAR MOUNTED BUS AIR CONDITIONER

(75) Inventor: David A. Giordano, East Syracuse, NY (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/156,517

(22) Filed: May 28, 2002

(51) Int. Cl.[7] .......................... B60H 1/32; F25D 23/02
(52) U.S. Cl. .......................... 62/244; 62/296; 181/200
(58) Field of Search .................. 62/244, 265, 296; 181/200, 202, 205, 207, 208; 454/906

(56) References Cited

U.S. PATENT DOCUMENTS

| | | | | |
|---|---|---|---|---|
| 3,789,747 A | * | 2/1974 | Wasserman et al. | 454/186 |
| 4,724,748 A | * | 2/1988 | Geyer | 454/120 |
| 4,982,583 A | * | 1/1991 | Matsuda et al. | 62/244 |
| 5,522,768 A | * | 6/1996 | Brodt et al. | 454/234 |
| 5,533,346 A | * | 7/1996 | Freeman et al. | 62/89 |

* cited by examiner

*Primary Examiner*—William E. Tapolcai
(74) *Attorney, Agent, or Firm*—Wall Marjama & Bilinski LLP

(57) ABSTRACT

Sound attenuation apparatus for use in a bus in which an air conditioning unit that is mounted on the rear wall of the bus is arranged to exchange conditioned air for return air drawn from the buses passenger compartment through a central opening in the rear wall of the bus. A housing is mounted over the central opening inside the bus that has a front wall that extends to either side of the opening. Apertures are mounted in both the extended sections of the front wall that forces the return air passing through the housing to move over a tortuous path of travel thereby attenuating the sound in the air flow path. The interior surfaces of the housing are covered with an open cell foam material which further absorbs the sound in the air flow path.

9 Claims, 2 Drawing Sheets

SILENCER FOR REAR MOUNTED BUS AIR CONDITIONER

FIELD OF THE INVENTION

This invention relates to a small mass transit vehicle having an air conditioning unit mounted upon the rear wall of the vehicle and, in particular, to apparatus for attenuating the sound generated by the unit.

BACKGROUND OF THE INVENTION

In many small buses of the type used to shuttle people about airports or the like, the air conditioning unit that is used to provide cooling to the passenger compartment is generally mounted upon the outside of the buses rear wall. An opening is provided in the rear wall through which return air from the passenger compartment is drawn into the evaporator section of the air conditioning unit. Conditioned supply air from the evaporator is distributed throughout the bus through a system of ducts. The opening in the rear wall is typically situated directly over a row of seats located along the rear wall of the bus. As a consequence, passengers that are seated in the rear of the bus are subjected to a good deal of noise produced by the evaporator fans and the return air flow that is being drawn through the opening. The noise levels throughout the bus can, under certain conditions, be high enough so that passengers cannot effectively communicate verbally with the bus driver. Failure to communicate leads to a good deal of confusion within the bus and the failure of passengers to debus at the desired locations. This, in turn, produces missed connections and other unwanted travel delays.

SUMMARY OF THE INVENTION

It is therefore a primary object of the present invention to reduce the noise level in the passenger compartment generated by the air conditioning system of a small bus such as an airport shuttle bus or the like.

A still further object of the present invention is to improve the ability of passengers in a small bus to communicate effectively with the operator of the bus.

Another object of the present invention is to break the sound path of air that is returning from the passenger compartment of a small bus to the air conditioning unit of the bus without adversely effecting the efficiency of the unit.

These and other objects of the present invention are attained in a small mass transit vehicle that contains an air conditioned passenger compartment. The air conditioning unit is secured to the outside of the bus's rear wall. An opening is located centrally in the rear wall through which return air from the passengers compartment is drawn into the evaporator of the air conditioner. A housing is mounted over the central opening which has a front wall that extends laterally beyond either side of the opening. Apertures are mounted in the extended sections of the front wall so that the return air is forced to move over a tortuous path of travel between the apertures and the central opening thereby attenuating the noise associated with the return air flow. The interior surfaces of the housing are covered with an open celled foam which further attenuates the sound produced by the air conditioning unit.

BRIEF DESCRIPTION OF THE DRAWING

For a better understanding of these and other objects of the present invention, reference will be made to the following detailed description of the invention which is to be read in association with the following drawings, wherein.

DETAILED DESCRIPTION OF THE INVENTION

Figure 1:
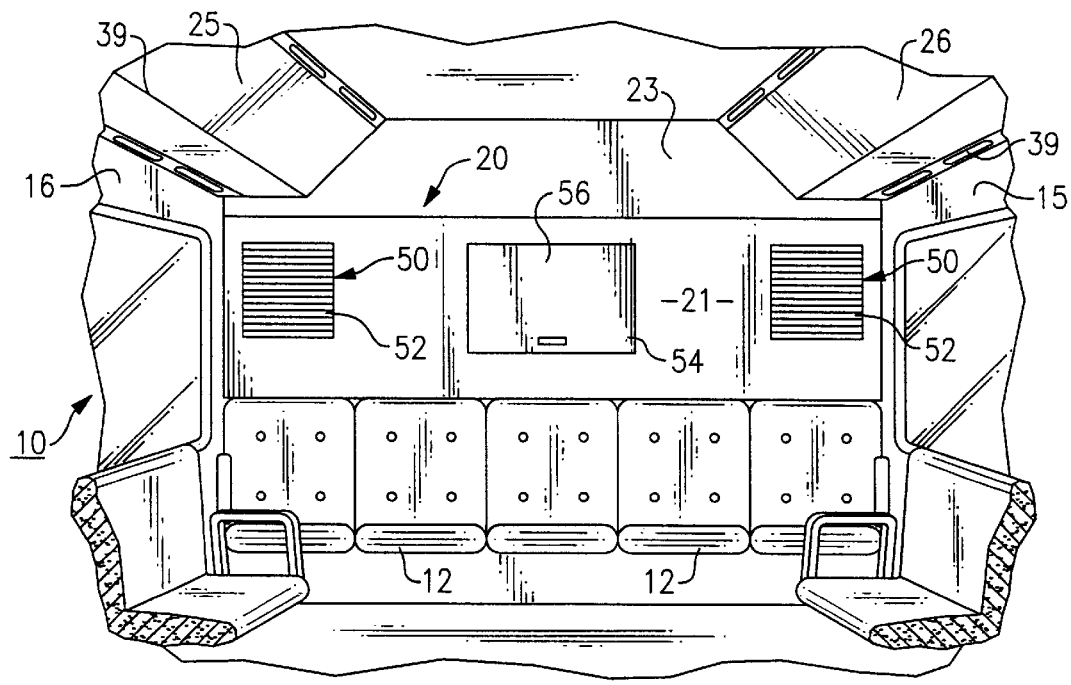
FIG. 1 is a partial front elevational view illustrating the noise attenuation apparatus embodying the teachings of the present invention for reducing the level of noise generated by the air conditioning unit of a small bus.
Figure 2:
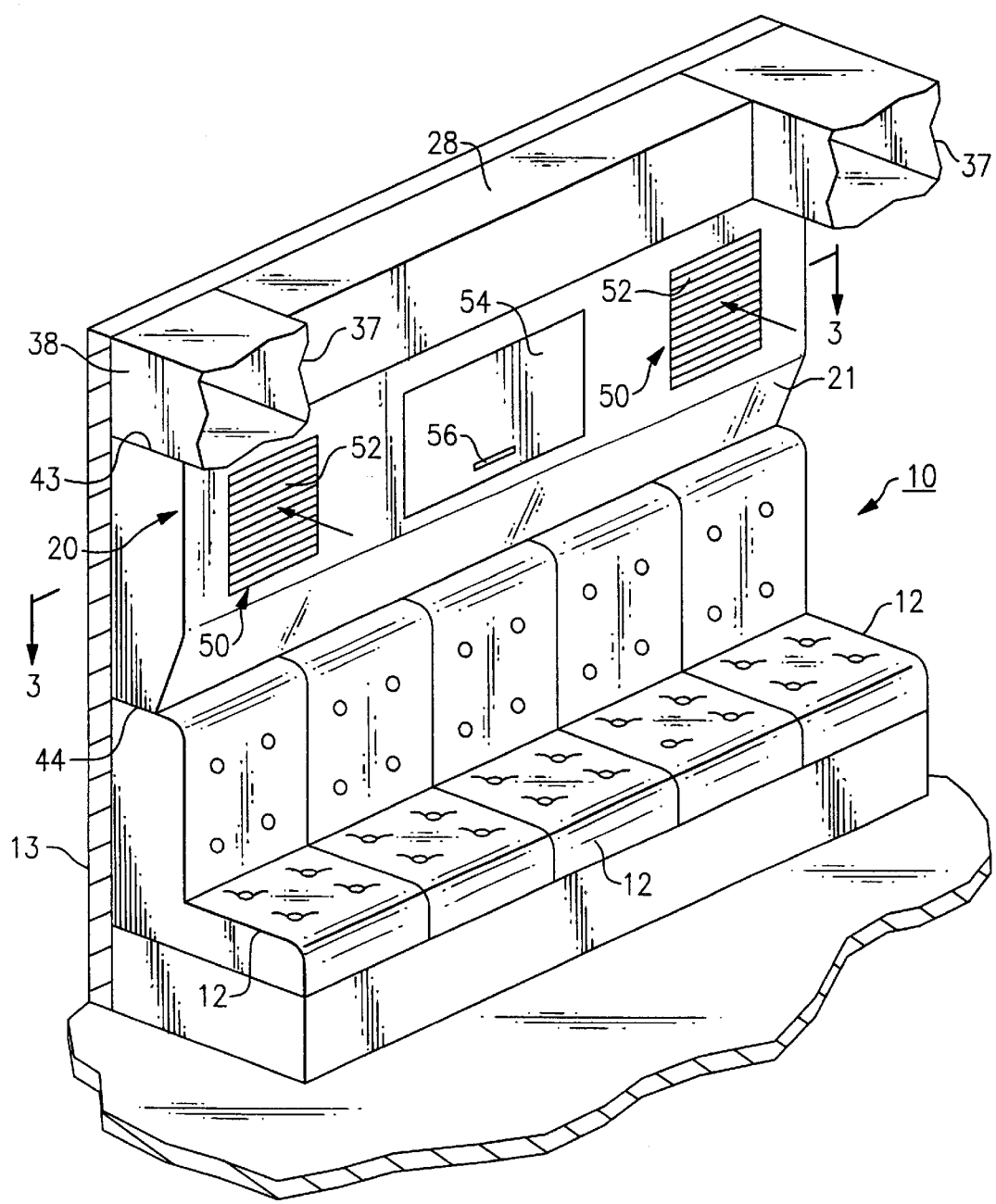
FIG. 2 is a partial perspective view further illustrating the noise attenuating apparatus.

Turning now to the drawings, the rear section of a small shuttle bus 10 is shown in FIGS. 1 and 2. A series of passenger seats 12—12 are mounted against the rear wall 13 of the bus which extend laterally between the opposed side walls 15 and 16 of the bus. A rectangular shaped housing, generally referenced 20, is mounted upon the rear wall of the bus over the rear seats. The front wall 21 of the housing also extends laterally from one side wall of the bus to the opposing side. A rear wall soffit 23 is mounted between the top of the housing and the ceiling of the bus. A pair of sidewall soffits 25 and 26 extend along the side walls over the bus windows and doors.

Figure 3:
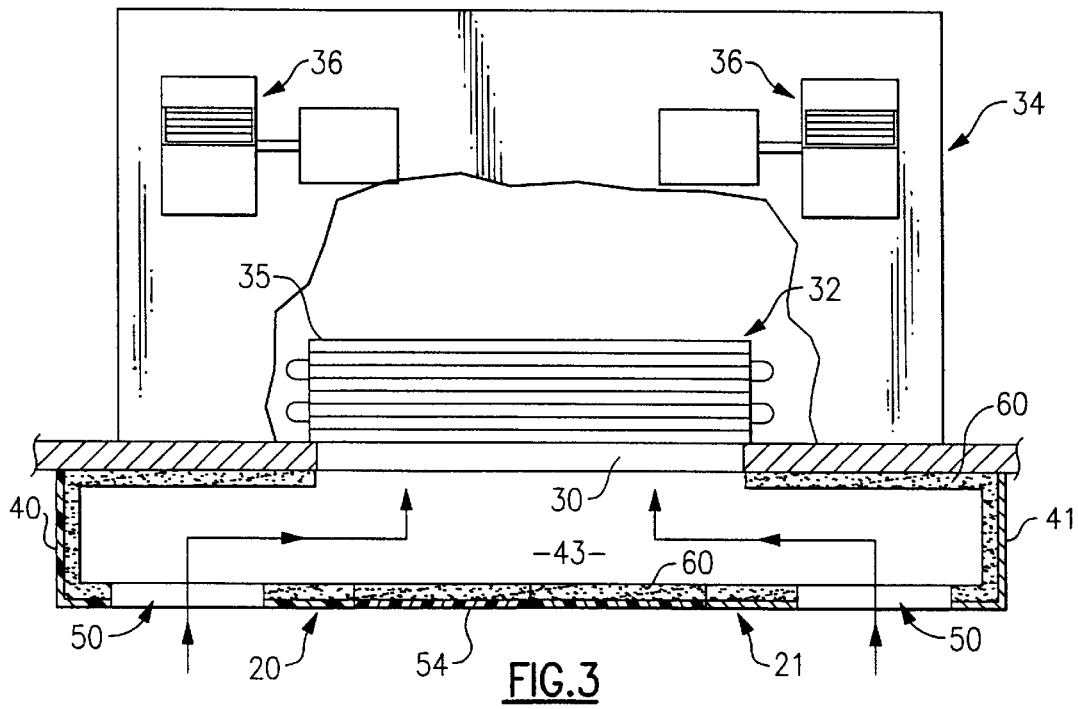
FIG. 3 is a sectional view taken along lines 3—3 in FIG. 2.

With further reference to FIG. 3 there is shown the original opening 30 is formed centrally in the rear wall of the bus that communicates with the evaporator section 32 of an air conditioner 34 that serves the passenger compartment of the bus. The air conditioner unit is secured to the outside surface of the rear wall in a conventional and well known manner. The central opening is totally enclosed within the housing 20 and is arranged to allow return air from the passengers' compartment to be drawn through the evaporator coil 35 by the evaporator fans 36 wherein the air is conditioned. A pair of supply air ducts 37—37 are mounted within the side wall soffits and are connected to the outlet of the evaporator section by a connecting duct 38 which passes through the rear wall soffit. Under the influence of the evaporator fan, the conditioned supply air is moved through the duct system and discharged into the passengers compartment through a series of outlet vents 39 (FIG. 1).

As noted above, both the return air flow and the air conditioning equipment that is mounted on the rear wall of the bus can generate a good deal of noise within the passengers compartment of the bus and has been a long standing problem in small type conveyances where verbal communication between the operator and his passengers is vital to an orderly flow of people on and off the bus. As will be explained in greater detail below, the housing 20 has been designed to prevent any line of sight flow path by which the return air can enter the opening to the evaporator section. It has been found that breaking line of sight between the noise source (air conditioning unit) and the receiver (passengers' ears) by causing the return air to move over a tortuous path of travel is an effective method of noise attenuation.

As best illustrated in FIG. 3, the front wall of the housing extends laterally to either side of the central return air opening and substantially spans the distance between the two side walls. The housing has a pair of end walls 40 and 41 as well as a top wall 43 and a bottom wall 44 that cooperate with the rear wall of the bus to form a plenum chamber that surrounds the central opening. Although not shown, seals are provided by flanges between the housing and the rear wall of the bus to prevent air from leaking from the housing. Return air apertures 50—50 are placed in the front wall of the housing in the two laterally extended end sections of the wall so that no part of the apertures are axially aligned with the central opening in the rear wall. As indicated by the arrows, the return air flow that is being drawn into the housing is forced to make two right angle turns as it moves through the housing breaking the sound path of the return air stream and thus reducing its noise level.

The return air apertures are placed high in the housing and as close as possible to the side walls of the bus so that the return air flow does not disturb passengers seated in the back row of the bus. A grille 52 is secured over each aperture to prevent unauthorized access to the housing. An access door 54 is centrally mounted in the front wall of the housing which allows authorized personnel to gain access to interior of the housing for maintenance and repair purposes. The door contains a recessed lock 56 that can only be unlocked using a special key or tool.

The interior surfaces of the housing walls and access doors are covered with an open cell acoustic foam 60 that effectively absorbs sound and further reduces the noise level inside the passengers compartment.

Tests conducted on the above described noise attenuation system clearly show a decided reduction in noise in all sections of the bus interior and in particular in the rear section of the bus. As a result, passengers situated in the rear of the bus are able to verbally communicate clearly with the driver thus eliminating much of the confusion previously attributable to the noise factor.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. Sound attenuation apparatus for use in a small bus that contains an air conditioned passengers compartment, said apparatus including an air conditioning unit that includes an evaporator that is secured to the outside of a rear wall of said bus, said rear wall having a centrally located opening through which return air from the passenger compartment is drawn into the evaporator, fan means for drawing return air into the evaporator and distributing conditioned supply air back to the passenger compartment through supply air ducts, a housing mounted inside said bus over said central opening for enclosing said opening, said housing having a front wall that extends laterally to either side of said opening;

each extended section of said housing containing a return air aperture such that return air passing through said apertures is forced to follow a tortuous path of travel between said apertures and said opening thereby attenuating the sound of the return air flow.

2. The apparatus of claim 1 wherein said housing is mounted above a series of seats that extend across the opposed side walls of the bus.

3. The apparatus of claim 2 wherein each return air aperture is mounted adjacent to a sidewall of said bus.

4. The apparatus of claim 1 wherein said housing has interior surfaces that are covered with a sound attenuating material.

5. The apparatus of claim 4 wherein said sound attenuating material is an open celled foam.

6. The apparatus of claim 1 wherein said front wall of said housing contains a security door means for allowing authorized access to the interior of the housing.

7. The apparatus of claim 6 wherein each return air aperture is covered with a grill to prevent unauthorized access to the interior of said housing.

8. The aperture of claim 1 that further includes supply air ducts that are connected to the evaporator.

9. The aperture of claim 8 wherein said supply air ducts are connected to side wall ducts for distributing supply air along the length of the bus.

* * * * *